US009007298B2

(12) United States Patent
Moyse

(10) Patent No.: US 9,007,298 B2
(45) Date of Patent: Apr. 14, 2015

(54) DISPLAY CONTROL MODE

(75) Inventor: Philip Moyse, Cambridge (GB)

(73) Assignee: Plastic Logic Limited, Cambridge (GB)

( * ) Notice: Subject to any disclaimer, the term of this patent is extended or adjusted under 35 U.S.C. 154(b) by 0 days.

(21) Appl. No.: 13/816,926

(22) PCT Filed: Aug. 12, 2011

(86) PCT No.: PCT/GB2011/051529
§ 371 (c)(1), (2), (4) Date: Mar. 20, 2013

(87) PCT Pub. No.: WO2012/025738
PCT Pub. Date: Mar. 1, 2012

(65) Prior Publication Data

US 2013/0169605 A1 Jul. 4, 2013

(30) Foreign Application Priority Data

Aug. 25, 2010 (GB) .................................. 1014186.9

(51) Int. Cl.
*G02F 1/167* (2006.01)
*G09G 3/02* (2006.01)
(Continued)

(52) U.S. Cl.
CPC ................ *G09G 3/02* (2013.01); *G09G 3/2025* (2013.01); *G09G 3/3433* (2013.01); (Continued)

(58) Field of Classification Search
CPC ... G09G 3/269; G09G 3/2693; G09G 3/2937; G09G 3/3688; G09G 3/3648; G09G 2310/0205; G09G 2310/0224; G09G 2310/0248; G09G 2310/051; G09G 2310/027; G09G 2310/08; G09G 2310/0204
USPC ............... 345/87–104, 107, 208, 60, 54, 204, 345/214, 634, 1.1–1.3; 359/296
See application file for complete search history.

(56) References Cited

U.S. PATENT DOCUMENTS 5,889,568 A 3/1999 Seraphim et al.
2004/0263939 A1 * 12/2004 Yano ............................ 359/238
(Continued)

FOREIGN PATENT DOCUMENTS

EP 1600918 A2 11/2005
EP 1677276 A1 7/2006
(Continued)

OTHER PUBLICATIONS

International Preliminary Report on Patentability and Written Opinion for International Application No. PCT/GB2011/051529 dated Oct. 4, 2011.
(Continued)

*Primary Examiner* — Lun-Yi Lao
*Assistant Examiner* — Saiful A Siddiqui
(74) *Attorney, Agent, or Firm* — Knobbbe, Martens, Olson & Bear, LLP

(57) ABSTRACT

A method updates an image displayed on an electronic display. The image can include a first region having multiple lines and a second region also having multiple lines. The method includes driving the pixels of the first and second regions according to one or more frames. In a first frame, driving the pixels of the first and second regions is done by scanning the lines of the regions from a first end of the first region to a second end of the second region, the second end opposite the first end along a scanning direction. In a second frame, driving the pixels of the first and second regions is done by scanning the lines of the regions from the first end to the second end, and the scanning begins before the scanning according to the first frame reaches the second end.

11 Claims, 8 Drawing Sheets

(51) Int. Cl.
*G09G 3/20* (2006.01)
*G09G 3/34* (2006.01)

(52) U.S. Cl.
CPC . *G09G 2300/023* (2013.01); *G09G 2310/0205* (2013.01); *G09G 2310/0216* (2013.01); *G09G 2310/0218* (2013.01); *G09G 2310/0221* (2013.01); *G09G 2310/0224* (2013.01); *G09G 2310/0227* (2013.01); *G09G 2320/0257* (2013.01)

(56) References Cited

U.S. PATENT DOCUMENTS

| | | | |
|---|---|---|---|
| 2005/0275645 A1 | 12/2005 | Shen et al. | |
| 2006/0017663 A1* | 1/2006 | Yamamoto et al. | 345/75.2 |
| 2006/0279489 A1 | 12/2006 | Ouchi et al. | |
| 2008/0192158 A1* | 8/2008 | Yoshihara et al. | 349/33 |

FOREIGN PATENT DOCUMENTS

| | | | |
|---|---|---|---|
| JP | 2001-021865 A | 1/2001 | |
| WO | WO 2010/090114 A1 | 8/2010 | |

OTHER PUBLICATIONS

Search Report issued in Application GB1014186.9, dated Dec. 3, 2010.

European Search Report re EP Application No. 11746303.4, dated Nov. 27, 2014.

* cited by examiner

DISPLAY CONTROL MODE

Cross-Reference to Related Applications

This application is the U.S. National Phase under 35 U.S.C. §371 of International Application No. PCT/GB2011/051529, filed Aug. 12, 2011, designating the United States and published in English on Mar. 1, 2012, as WO 2012/025738, which claims priority to United Kingdom Application No. 1014186.9, filed Aug. 25, 2010.

FIELD OF THE INVENTION

This invention relates for example to techniques for employing a plurality of backplane regions of a split overall backplane to form a single display screen, in particular, but not exclusively, wherein the display medium is electrophoretic. Embodiments of the technique are particularly useful for electronic document reading devices. More specifically, the invention relates to a method of updating an image displayed on an electronic display, an electronic display, and to an electronic device.

BACKGROUND TO THE INVENTION

Electrophoretic display screens have many advantages for electronic reading devices because they are generally able to provide a thin and/or non-volatile display. The electrophoretic display medium may be driven by a backplane behind the electrophoretic medium. In some preferred devices the backplane is fabricated using solution based thin film transistors (TFTs), preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 (which describes a four or five layer pixel architecture) and PCT/GB2006/050265, all hereby incorporated by reference in their entirety. Thus, in embodiments, the TFTs comprise an organic semiconductor material, for example a solution processable conjugated polymeric or oligomeric material, and in embodiments the display screen, more particularly the backplane, is adapted to solution deposition, for example comprising solution-processed polymers and vacuum-deposited metals.

Image update of an electrophoretic display screen may result in a faint impression of the previous image remaining visible, i.e., "ghosting". Such an impression may be avoided or attenuated by refreshing the screen several times, for example by firstly applying a frame(s) to set every pixel white, then a frame(s) to set every pixel black, then another frame(s) for the colours/grey levels of the desired image. Where such a display screen has a split backplane for example due to combining independent display panels, it is desirable to update the split backplane regions in parallel such that the updating involving successive frames can be performed more quickly. However, effects due to the split backplane may in this case become visually perceptible to the human eye.

For example, an electronic reading device may, in practice, comprise two or more physically independent display panels that have been butted together to create a single larger one. In such a reader device having correspondingly two or more backplanes, effects due to the multi-display panel construction may indicate to the user that the device in fact comprises more than one display panel and provide an undesirable visual distraction to said user.

The field of electronic reading devices therefore continues to provide a need for an improved display screen comprising a split overall backplane. Such improvement may have one or more advantages of, inter alia, creating a more visually pleasing reader experience and/or improving reliability of the screen, preferably avoiding or reducing any inconsistencies between the physically independent display panels of the screen, wherein such inconsistencies may for example degrade the reliability and/or result in undesirable visible performance issues.

Other devices are known from US2005/0275645 (Vastview Tech Inc), US2006/0279489 (Hitachi Ltd), EP1677276 (LG Philips LCD co Ltd), JP2001021865 (Matsushita Electric Ind Co Ltd) and U.S. Pat. No. 5,889,568 (Rainbow Displays Inc).

SUMMARY

According to a first aspect of the invention, there is provided a method of updating at least one image displayed on an electronic display comprising a plurality of regions, each said region comprising of a plurality of lines of pixels, said display comprising at least a first said region and a second said region, said first region having a first said plurality of lines and said second region having a second said plurality of lines, said updating comprising driving said pixels of said first and second regions according to each of a plurality of frames, the method comprising: driving said pixels of said first and second regions according to a first said frame by scanning said lines of said regions from one end of said regions to an opposite end of said regions, said one end being an end of said first region and said opposite end being an end of said second region, said second end opposite said first end along a direction of a said scanning; and driving said pixels of said first and second regions according to a second said frame by scanning said lines of said regions from said one end of said regions to said opposite end of said regions, wherein said scanning according to the second frame begins before said scanning according to the first frame reaches said opposite end.

Each said region may comprise a backplane region, and may further comprise a corresponding area of display medium. The backplane regions of an embodiment may be physically separate or integral within an overall backplane. For example, the backplane regions may be abutted, e.g., as shown in FIG. 7. Similarly, such display medium areas of an embodiment may be physically separate or integral within an overall display medium component, e.g., single sheet of display medium. In embodiments, the said regions may be provided by joining two display panels each comprising backplane and display media.

The driving of said pixels of the first and second regions according to each of a plurality of frames may perform a single image update, preferably wherein the driving the pixels comprises driving according to each of a plurality of frames in turn.

An embodiment of the display may be an LCD display, an LED display, a plasma display, or may be an electronic paper display, e.g., comprising electrophoretic display medium or of an electrowetting type. In such embodiments, the pixels may be defined by the position of transistors and/or storage capacitors on the backplane. (Throughout this specification, the term display generally refers to an apparatus comprising, either exclusively or amongst other components, a display screen comprising at least a backplane and a display medium).

Advantageously the method may reduce or eliminate visible effects on the image due to the plurality of regions, e.g., where two backplanes are abutted adjacent each other and the existence of a join between the regions may otherwise be immediately detectable by the user viewing the image. Such an advantage may be enhanced where the driving according to the second frame begins when the driving according to the first frame starts scanning the second region after scanning the first region. Preferably, the driving according to the first and second frames are synchronised such that a predetermined time interval occurs between the driving according to the first frame and the driving according to the second frame, and similarly for any further frames, e.g., between the driving of the second and a third frame, etc.

There may further be provided the method, wherein said first and second regions are substantially adjacent and substantially aligned along a direction of a said scanning from said one end to said opposite end.

There may further be provided the method, wherein the first and second regions are physically separate.

There may further be provided the method, wherein the display comprises a backplane layer formed of at least two backplane regions, and one or more display media placed above the backplane regions.

There may further be provided the method, wherein said first and second regions comprise respective backplane regions configured to drive a single monolithic layer of display medium.

There may further be provided the method, wherein said electronic display is an LCD display, a plasma display, or is an electronic paper display preferably comprising electrophoretic or electrowetting display medium.

A storage medium may store computer program instructions to program a programmable processing apparatus to become operable to perform the method of any one of the preceding claims.

A signal may carry computer program instructions to program a programmable processing apparatus to become operable to perform the method of any one of the preceding claims.

For example, an embodiment of the above storage medium storing computer programs or signal(s) carrying computer program instructions provides processor control code to implement the above-described method, e.g., on an embedded processor.

The code may be provided on a carrier such as a storage medium in the form of a disk, CD- or DVD-ROM, programmed memory such as read-only memory (Firmware) or Static RAM (SRAM) or Dynamic RAM (DRAM), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

According to a second aspect of the present invention, there is provided an electronic display comprising a plurality of regions, each said region comprising of a plurality of lines of pixels, said display comprising at least a first said region and a second said region, said first region having a first said plurality of lines and said second region having a second said plurality of lines, the electronic display comprising a driver configured to drive said pixels of said first and second regions according to each of a plurality of frames, the electronic display comprising: said driver configured to drive said pixels of said first plurality of lines and said second plurality of lines according to a first said frame while scanning said first and second pluralities of lines from a first end to a second end and to drive said pixels of said first and second pluralities of lines according to a second said frame while scanning said first and second pluralities of lines from said first end to said second end, wherein said first end is an end of said first region and said second end is an end of said second region, said second end opposite said first end along a direction of a said scanning, wherein said driver is configured to begin said scanning while driving the pixels according to the second frame before said scanning while driving the pixels according to the first frame reaches said opposite end.

In an embodiment, the driver may be configured to drive the pixels of the first and second regions according to each of a plurality of frames to perform a single image update.

There may further be provided the electronic display, wherein said first and second regions are substantially adjacent and substantially aligned along a direction of a said scanning from said one end to said opposite end.

There may further be provided the electronic display, wherein the first and second regions are physically separate.

There may further be provided the electronic display, wherein the display comprises a backplane layer formed of at least two backplane regions, and one or more display media sheets placed above the backplane regions.

There may further be provided the electronic display, wherein said display comprises first and second backplane regions configured to drive a single monolithic layer of display medium.

There may further be provided the electronic display, wherein said electronic display is an LCD display, LED display, plasma display, electrowetting display or comprises electrophoretic display medium.

An electronic device may comprise the electronic display, preferably wherein said device is an electronic document reader.

According to a third aspect of the present invention, there is provided an electronic device having a display comprising a plurality of regions, each said region comprising of a plurality of lines of pixels, said display comprising at least a first said region and a second said region, said first region having a first said plurality of lines and said second region having a second said plurality of lines, the electronic device comprising a driver configured to drive said pixels of said first and second regions according to each of a plurality of frames to perform a single image update of an image displayed on said display, wherein said driver is configured to provide a pulse width modulated (PWM) drive to said display, wherein said PWM drive is coordinated over a plurality of consecutive display frames to update the image. However, in an alternative embodiment, a drive scheme other than PWM may be used.

According to three other aspects of the present invention, there are provided, respectively,: a method of updating an image displayed on an electronic paper display screen as described herein, preferably as described and illustrated herein; an electronic paper display screen as described herein, preferably as described and illustrated; and an electronic document reader as described herein, preferably as described and illustrated herein.

Any number of the above aspects, with or without any one or more of the optional features of the preferred embodiments, may be combined in any permutation. Preferred embodiments are defined in the appended dependent claims.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

The following generally relates to a pseudo monolithic update scheme for multi-part displays, and generally focuses on embodiments using an electrophoretic display medium that requires multiple frames (or sub-frames as they are sometimes referred to) to achieve a single image update. However, an embodiment may alternatively be applied to an LCD display, an LED display, a plasma display, or various types of electronic paper display such as an electrowetting display. Any such display may comprise two regions such that an embodiment is advantageously applicable thereto; and may require a single or multiple frame(s) to achieve a single image update.

Moreover, the following generally focuses on embodiments using two backplane regions, i.e., two halves of an overall backplane. However, the principle of pseudo monolithic updating could be expanded to include other display systems comprising two or more sub-displays that use line scanning, particularly where the scanning rate is slow. Thus, the principle of the invention may be extended to embodiments having more than two backplane regions.

The backplane regions and corresponding display medium regions may be of any size. Moreover, by employing more or larger backplane regions and corresponding display medium regions, a larger overall device, e.g. an A4 or letter sized (e.g., standard US letter size) electronic document reader or a billboard for displaying for example roadside advertisements, may be achieved.

An embodiment of an electronic paper display screen has an electrophoretic display medium, e.g., electrophoretic display screen. In such an embodiment, pixels may be defined by the position of transistors (e.g., thin film transistors (TFTs)) and storage capacitors on the backplane.

A preferred embodiment is used in a display comprising multiple backplanes and a single electrophoretic medium. However, alternative arrangements may use any other type of display medium, for example electrowetting, LCD, LED, plasma and could be colour (e.g., RGB) or monochrome.

The example embodiment uses a 1280×960 display screen (e.g., approx. A4 size: 210×297 mm, or standard US letter size: 216×279 mm) that has a single front plane medium (e.g., a single monolithic sheet of electronic paper). However, the embodiment has two 1280×480 backplanes combined to provide an overall backplane corresponding to the above 1280×960 display screen. Such a screen may be considered as two physically independent display panels that have been butted together to create a single larger one.

Figure 6A:
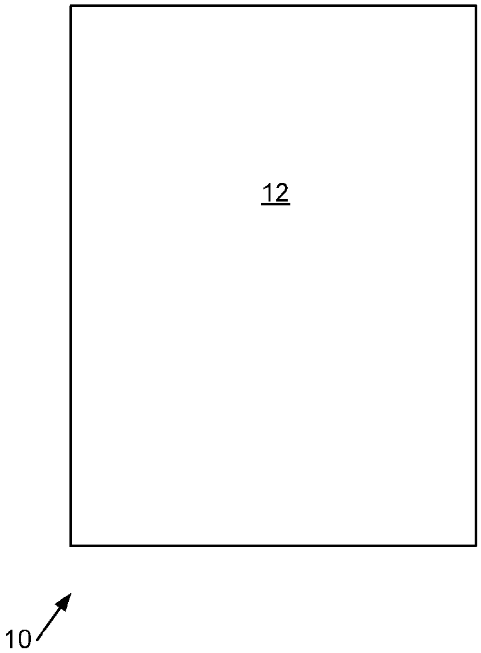
FIGS. 6(*a*)-(*c*) show, respectively, a front, display face view, a rear view, and a vertical cross-section view of an electronic paper display screen according to an embodiment of the invention.
Figure 6B:
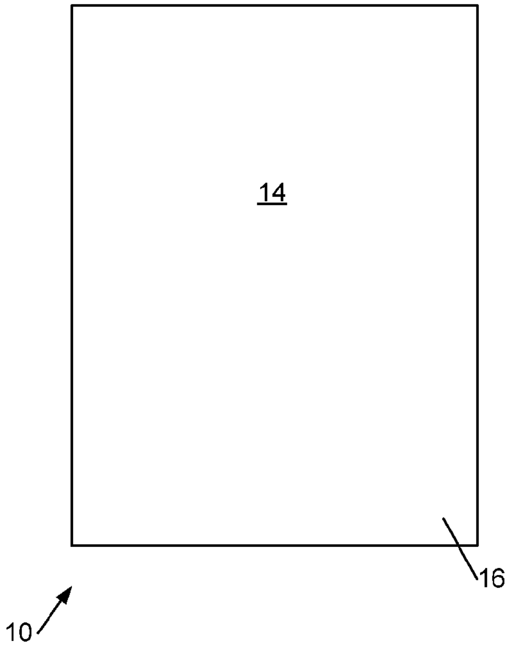
Figure 6C:
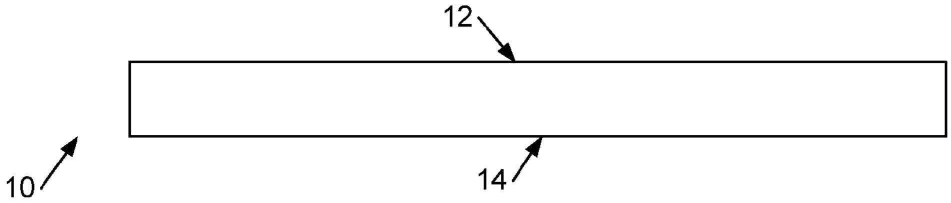

FIGS. 6(*a*) to 6(*c*) schematically illustrate the electronic paper display screen embodiment having a front display face 12 and a rear face 14.

Figure 7:
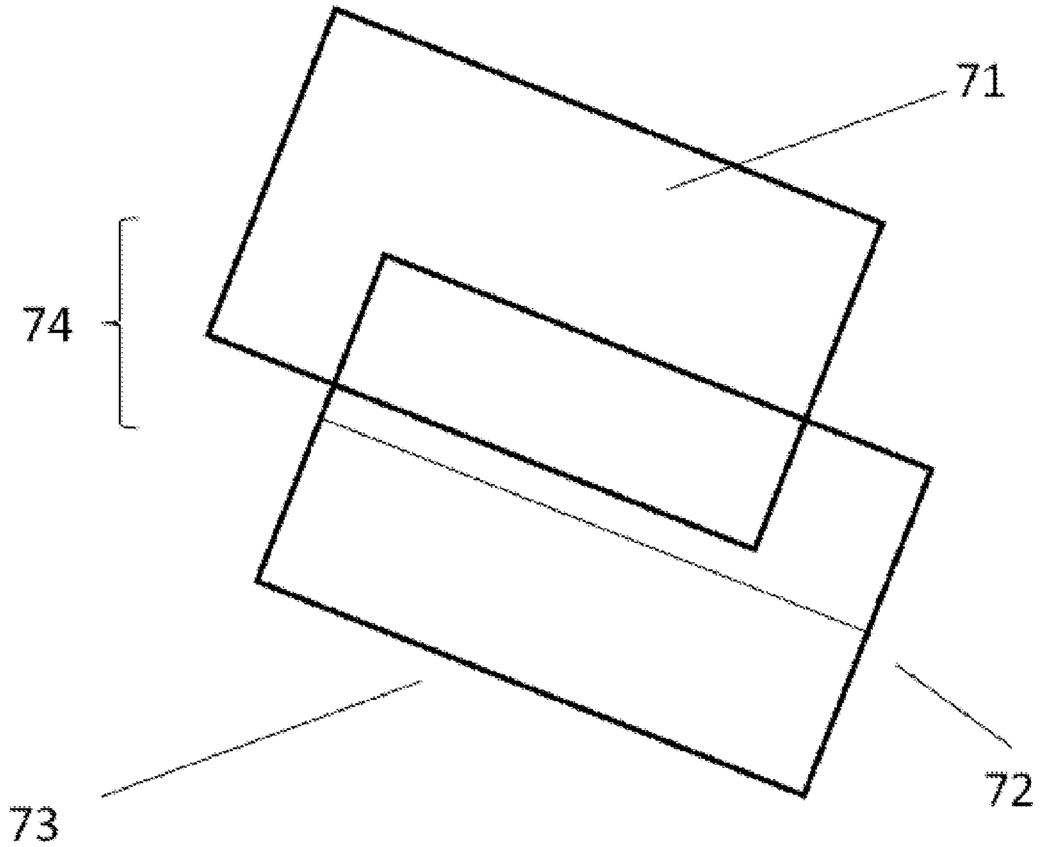
FIG. 7 shows further detail of the display screen of FIG. 6, the display screen comprising between the front and rear sides a single layer of display medium and abutted backplanes.

As shown in FIG. 7, the display screen may comprise between the front and rear sides a single layer of display medium (71) and two or more abutted transistor and pixel capacitor backplanes (72). Reference numeral 73 relates to the presence of substrate and moisture barrier layers (now shown). Similarly, reference numeral 74 relates to the presence of an optional U.V. and moisture barrier (not shown).

Thus, speaking generally, a vertical cross-section through a display region of the embodiment of FIG. 6 may comprise an electrophoretic display screen with a two or more part backplane composed of organic or non-organic transistors and pixel capacitors. In a more specific example, such an embodiment may be as shown in FIG. 8.

Figure 8:
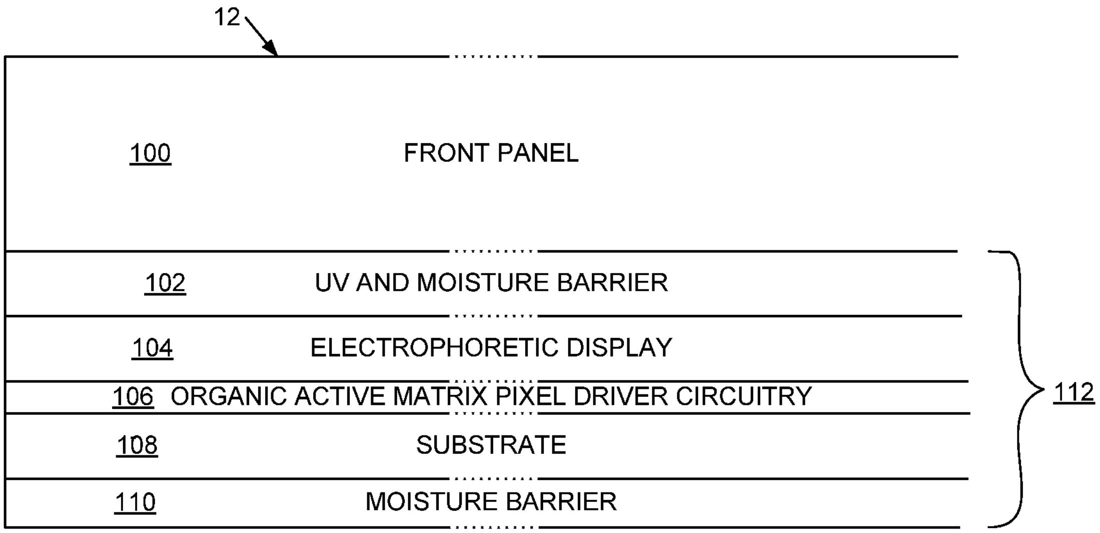
FIG. 8 shows a detailed vertical cross-section through a display portion of an electronic paper display screen of FIGS. 6(*a*)-(*c*)

FIG. 8 illustrates an example vertical cross-section through a display region of the embodiment of FIG. 6. The drawing is not to scale. As can be seen, the cross-section has a substantially transparent front panel 100, for example made of Perspex®, which acts as a structural member. The active matrix pixel driver circuitry layer 106 may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. The thin layer 106 may be a split region of an overall backplane, e.g., the first or second backplane region. Attached over this thin layer, for example by adhesive, is an electrophoretic display 104, although additional or alternative display media such as an organic LED display medium or liquid-crystal display medium may also be used. The electronic display 104 may further have a common top plane ("top plane com"; not shown in FIG. 8) disposed preferably directly over it. Preferably, this top plane is of low impedance. A UV and/or moisture barrier 102 is provided over the electronic display 104, for example of polyethylene and/or Aclar™, a fluoropolymer (polychlorotrifluoroethylene-PCTFE); preferably this incorporates an ultraviolet (UV) filter—many suitable UV-filtering plastic materials are available commercially. Additionally or alternatively a UV filtering or blocking layer of adhesive may be included between one more of the layers shown in FIG. 8. A moisture barrier 110 is also preferably provided under substrate 108; since this moisture barrier does not need to be transparent preferably moisture barrier 110 incorporates a metallic moisture barrier such as a layer of aluminum foil. This allows the moisture barrier to be thinner, hence enhancing overall flexibility.

Approximate example thicknesses for the layers are as follows: 100 μm for moisture barrier 110, 200 μm for substrate 108, 5-6 μm for active layer 106, 190 μm for display 104, and 200 μm for moisture barrier 102. The set of layers 102-110 form an encapsulated electronic display 112; preferably this is bonded, for example by adhesive, to a transparent display panel 100. The front panel 100 may have a thickness in the range 0.5-2 mm, for example approximately 1 mm.

Figure 9:
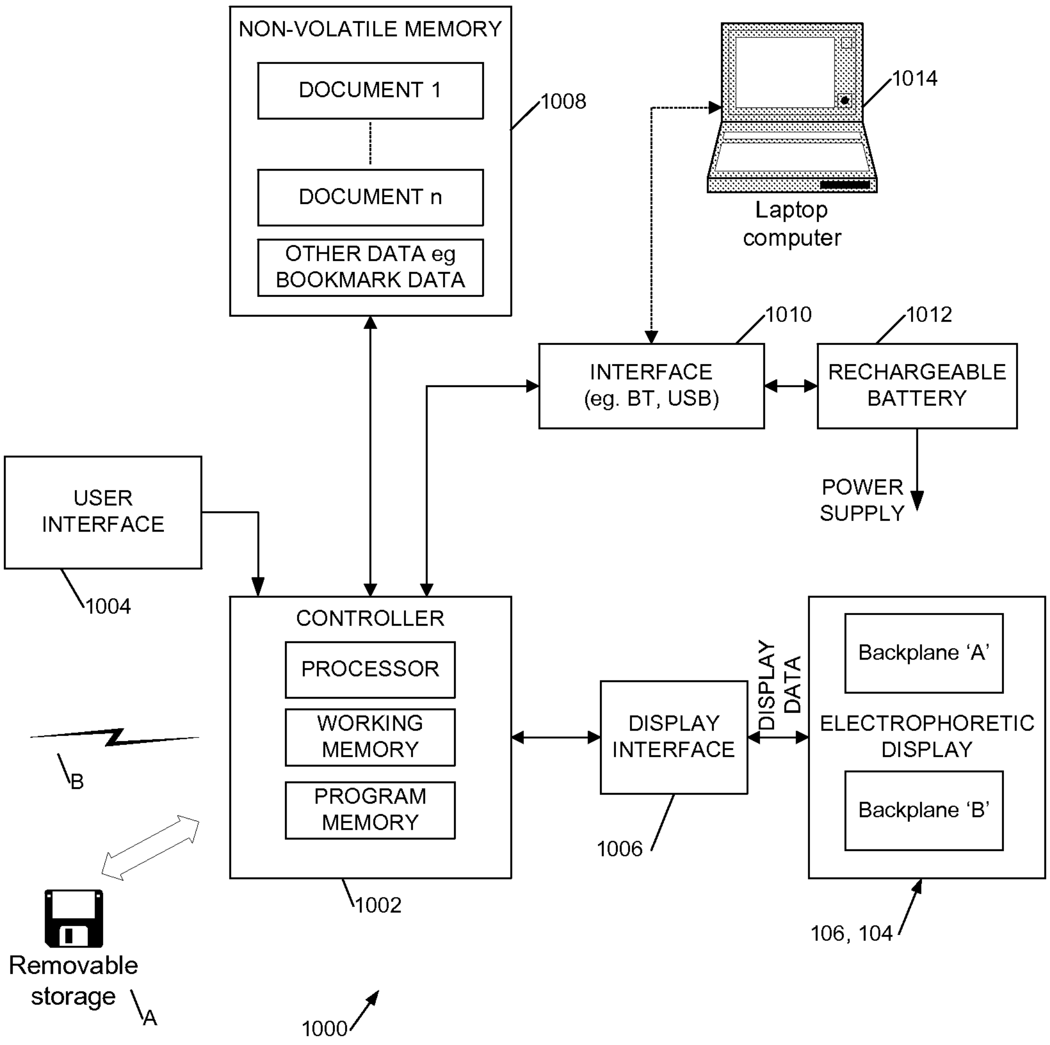
FIG. 9 shows a summary block diagram of system including control electronics of an electronic document reader comprising the electronic paper display screen.
Figure 10:
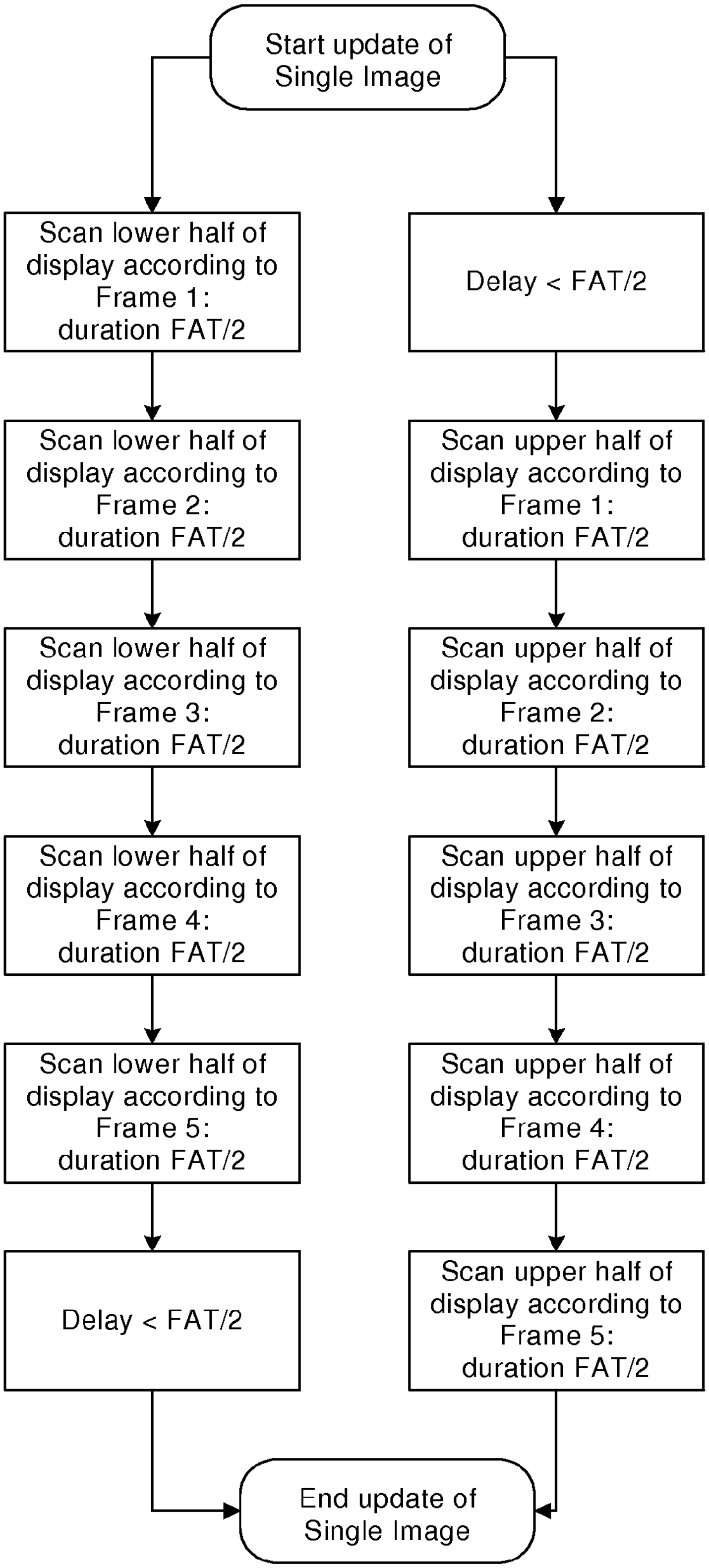
FIG. 10 shows a summary flow diagram of an example pseudo-monolithic display image update process of the embodiment.

FIG. 9 shows a summary block diagram of a system including control electronics of an electronic document reader comprising the electronic paper display screen. The block diagram shows example control circuitry 1000 suitable for the electronic document reader 10. The control circuitry comprises a controller 1002 including a processor, working memory and programme memory, coupled to a user interface 1004 for example for controls 130. The controller is also coupled to the active matrix driver circuitry 106 and electrophoretic display 104 by a display interface 1006 for example provided by integrated circuits 120. In this way controller 1002 is able to send electronic document data to the display 104 and, optionally, to receive touch-sense data from the display. The electrophoretic display 104 comprises two backplanes, 'A' and 'B'. The control electronics also includes non-volatile memory 1008, for example Flash memory for storing data for one or more documents for display and, optionally, other data such as user bookmark locations and the like. An external interface 1010 is provided for optionally interfacing with, e.g., an external computing device such as laptop, PDA, or mobile or 'smart' phone 1014 to receive document data and, optionally, to provide data such as user bookmark data. Such an interface may allow content to be obtained, e.g., by wireless communication and/or to allow content to be downloaded from a remote server via public networks. The interface 1010 may comprise a wired, for example USB, and/or wireless, for example Bluetooth™ interface and, optionally, an inductive connection to receive power. The latter feature enables embodiments of the device to entirely dispense with physical electrical connections and hence facilitates inter alia a simpler physical construction and improved device aesthetics as well as greater resistance to moisture. A rechargeable battery 1012 or other rechargeable power source is connected to interface 1010 for recharging, and provides a power supply to the control electronics and display.

FIG. 9 further shows a disc A for storing computer program instructions to program controller 1002 to perform a pseudo monolithic display update is shown. Similarly, FIG. 9 shows a signal B carrying such computer program instructions. However, more typically, a disc is not used for this purpose and program data is stored in non-volatile memory, e.g. SRAM and is then loaded on an as-needed basis into faster volatile program memory space e.g. DRAM. Nevertheless, a disk A and/or carrier B may be used to provide content to be displayed and/or to provide other computer program instructions to the controller 1002.

The skilled person will appreciate that processor control code for a wide range of functions may be stored in the program memory. By way of example a simple document display procedure may comprise, in operation, sensing a user control, determining which document to update, reading a portion of the relevant document from the non-volatile memory, and writing the read portion of the document to the page display.

In the display screen embodiment comprising the 1280 data columns and 960 data rows, selection of each column and row combination accesses a respective pixel. The pixel may comprise a transistor such as a thin film transistor (TFT) that provides a gated path to a capacitor, which is charged to hold a voltage for an associated display capsule. A row line (gate line) provides a path to the gate of the transistor and a column line (source line) provides a path to the source of the transistor. A signal(s) may be applied to the column line to update a corresponding pixel of a selected row to a desired colour or grey level state.

The capacitance provided with each pixel of a row maintains a voltage applied to a pixel during a line address time (LAT; typically several tens of micro-seconds) while the remaining rows are then scanned. In other words, the data or voltage level written to a pixel via a data column is held by a pixel capacitor, which substantially holds the pixel voltage at a required specific positive, zero or negative voltage depending on a desired colour or colour transition for a period of time that is typically several tens of milli-seconds. The capacitance may be intrinsic or additional to the intrinsic display screen capacitance, e.g., may be part of the display screen backplane.

Periodic scanning of each line during each drive waveform phase is typically required to set pixel capacitors to new values or to top-up the charge on each capacitance. Preferably each capacitance substantially holds the required charge state throughout the duration of a frame address time (FAT). The charge value on the capacitance is topped-up or changed only for the Line Address Time (LAT), in the present embodiment approximately, 1000th, of the FAT. With bistable displays however, this operation may stop after the pixel reaches the required state; this may be the case in some electrophoretic embodiments.

Thus, broadly speaking, a frame address time (FAT) may define time slots for pulse width modulation (PWM) driving waveforms for the display, i.e., a FAT corresponds to the PWM minimum time granularity in the embodiment. A typical FAT may be of the order of 5-40 ms. Within each frame each row of the display screen is selected in turn and the column lines of the display screen are driven with voltages defined by a PWM waveform configured to transition the pixel from its current state to its updated state.

As discussed above, each pixel has an associated pixel circuit comprising a field effect transistor (FET), in particular a thin film transistor, and a pixel capacitor for storing a voltage value applied to the pixel. For example, a row select line may be coupled to a gate connection of a pixel transistor and a column line to a source or drain connection. However the skilled person will appreciate that other switching configurations are possible and that, for example, a select line may be coupled to a drain/source connection rather than a gate connection.

Those skilled in the art will be aware of many examples of drive waveforms which may be employed. This specification is not concerned with details of any particular drive waveforms which may be employed for driving any type of display, e.g., electrophoretic. However it is useful to outline an example, to aid in understanding the operation of embodiments of the invention. Thus, for example, a PWM drive waveform may have three phases, a first phase in which the colour or grey-level of each pixel of the display is driven to a first intermediate display colour or grey-level, for example "white", a second phase in which each pixel's colour or grey-level is driven to a second intermediate display colour or grey-level, for example "black", and a third phase in which the display colour or grey-levels of the pixels are then set at respective desired levels, for example on a greyscale between black and white to form the final desired image.

One reason that an electrophoretic display screen may be driven in this manner is because the first intermediate ("white") level may not be well defined, depending upon the starting colour or grey-level of a pixel (and possibly its history). By taking a pixel from its initial state through white and then black (or vice-versa) to its final state a well-defined transition from the second intermediate level ("black") to the final state may be achieved. For example the first phase, to "white" may employ a voltage of, say, +15 volts; the second phase, to "black" may employ a voltage of, say, −15 volts, and an example, third phase to a display level of, say, light grey, may employ a voltage of, say, +15 volts for a reduced duration as compared with that used to achieve white (for example 120 ms versus 180 ms). The skilled person will appreciate that the polarities and voltages and intermediate display level "colours" are given by way of example only. Moreover, the embodiment has a pseudo-monolithic display update scheme that may eradicate or reduce to a minimum any undesirable visual effects caused by the two-part nature of the display, and/or avoid or reduce any inconsistencies between the two halves of the display caused by the update. Such inconsistencies could lead to a reliability or performance issue such as colour (or grey level) differences appearing between the between the two halves of the display.

Figure 5:
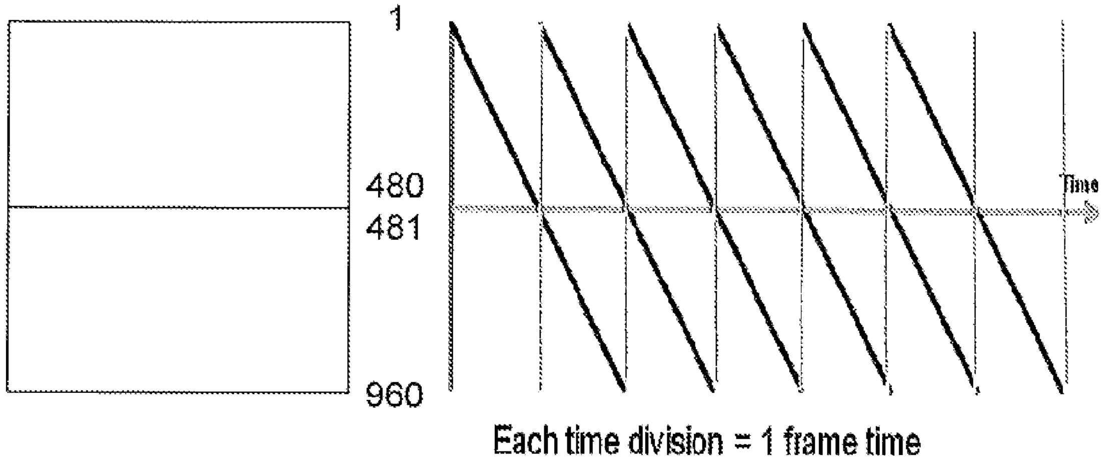
FIG. 5 illustrates a pseudo-monolithic update timing diagram (as in FIGS. 1-4, a boundary between two regions is shown between lines 480 and 481)

FIG. 5 shows a timing diagram of the pseudo-monolithic update scheme implementation of the embodiment. In this example, the update takes 6 frame times for each half of the display. However, the overall update for the combined display will take 7 frame times. The update may take more or less than 6 frame times, and the overall update time correspondingly more or less than 7 frame times in other examples. Each frame of an update may have a duration of, e.g., 5 ms-40 ms, for scanning all lines of a display.

In the first frame time there is activity only in the upper half of the two part display as it is scanned from line 1 through to line 480. In the next frame time, the upper half of the display is once again scanned from line 1 through to line 480. Moreover, at this time, the lower half of the display is scanned from line 481 through to line 960. Thus, in this example of FIG. 5, as soon as a current update frame begins to be asserted in the lower half, a new update frame begins in the upper half. Moreover, the first update to line 481 occurs immediately after the first update to line 480. Thus, there is advantageously no discontinuity in the update to the display between its two halves, such that a smooth update to the display with little or no visible join effects or tonal differences between the two halves of the display may be seen.

This update process continues, with both halves of the display being updated at the same time, but with the lower half of the display effectively one frame time behind the upper half. This results in the upper half of the display completing its update one frame time ahead of the lower half. The update completes with the final sweep of the lower half of the display. Note that the $n^{th}$ update to line 481 in this embodiment always occurs immediately after the $n^{th}$ update to line 480.

Those skilled in the art will appreciate that, generally speaking, the choice of 480 lines per half of the display in the present embodiment is ultimately arbitrary and in the more general case, the $n^{th}$ update to the first line of the second driven half of the display always occurs immediately after the $n^{th}$ update to the final line of the first driven half of the display.

Thus, during the first frame time of the overall display update only the upper half of the display is physically updated and during the final frame time of the overall display update only the lower half of the display is physically updated, extending the overall update time by 1 frame time when compared with alternative techniques.

Thus, the overall update time for each half of the display will not be changed by implementation of the pseudo-monolithic scheme in this embodiment, but because of the one frame delay in the start to the scanning of the lower half of the display, the update time for the entire display is extended by one frame time.

In view of the above, with all line scanning performed in the same direction in this embodiment, any display effects attributable to any asymmetrical properties in the display medium or its underlying backplane may advantageously not be invoked.

The following describes arrangements, each of which may optionally be implemented in an embodiment, preferably in combination with any one or more aspects of the present invention. When implemented in an embodiment, direct correspondence between elements of the above aspects and elements of the arrangements exists, for example, the electronic paper display screen, backplane regions, lines, pixels, etc. below correspond respectively to the display, regions, lines, pixels, etc. as specified in the above aspects of the invention.

One arrangement provides a method of updating an image displayed on an electronic paper display screen comprising a plurality of lines of pixels, said electronic paper display screen comprising a plurality of backplane regions for driving respective subsets of said plurality of lines, said backplane regions comprising at least a first said backplane region for driving a first said subset and a second said backplane region for driving a second said subset, said updating comprising driving said pixels according to each of a plurality of frames in turn to perform a single image update, the method comprising: driving said pixels according to a first said frame while scanning said plurality of lines from one end of said plurality of lines to an opposite end of said plurality of lines; and driving said pixels according to a second said frame while scanning said plurality of lines from said one end to said opposite end, wherein said scanning while driving the pixels according to the second frame begins before said scanning while driving the pixels according to the first frame reaches said opposite end, and each said scanning comprises scanning the first subset using the first backplane region and then scanning the second subset using the second backplane region, wherein the second subset is nearer to said opposite end than the first subset. For example, such an arrangement may: start scanning a region 1 with frame 1; at completion, immediately begin region 2 with frame 1 and, simultaneously, start region 1 with frame 2. The scanning of lines from one end to an opposite end may involve serially scanning, in turn, i.e., successively selecting, individual lines or individual subsets of more than one line. Preferably, every line of the plurality is, e.g., sequentially, selected during such a serial scan. The scanning may be raster scanning, or may address, e.g., all columns simultaneously when each row (line) is scanned.

Moreover, each scanning from one end of said plurality of lines to an opposite end of said plurality of lines may be performed as if the backplane regions were not separate, e.g., as if the display screen comprised a sole integral backplane for driving preferably a monolithic display media layer. Hence the method may be described as 'pseudo monolithic'. One implementation could have region 1 update with frame 1, then on completion, region 2 with frame 1, then on completion, region 1 with frame 2 etc. However, a preferred implementation has the second region updating with frame n, while the first region is updating with frame n+1.

Preferably, the subsets driven by respective backplane regions are mutually exclusive, i.e., no line is a member of more than one subset. Where the first and second backplane regions are respective halves of an overall backplane, the method may start updating the first half (e.g., upper, in the case that the pseudo monolithic mode is acting in a downward direction from the top of the display as shown in FIG. 5) according to the second frame while still driving the second half (e.g., lower) according to the first frame. Since the driving according to first frame may thus not be completed before driving according to the second frame begins, an advantage may be that data or waveforms of the two different frames are not respectively applied to consecutive lines. Thus, an advantageous end result of the updating may be to update a single image over the whole screen without any visible effect resulting from the separate backplane regions.

The plurality of backplane regions may be considered as a split backplane, e.g., each such region may each be a backplane of a respective display panel, a region of an at least logically divided overall backplane for driving a single display medium layer in common, a region of an at least logically divided overall backplane wherein each region drives a respective separate display medium layer, or a (sub-)backplane of a set of backplanes forming an overall backplane for driving a single display medium layer in common or wherein each sub-backplane drives a respective separate display medium layer.

An implementation may be particularly advantageous in a device wherein two separate display panels are butted together to create the effect of a single panel. Thus, there may further be provided the method, wherein the first and second backplane regions are physically separate, e.g., belong to different display panels. Additionally or alternatively, there may therefore be provided the method, wherein said first and second backplane regions drive a single monolithic layer of display medium, i.e., the single medium is in common to the two regions which may be physically and/or logically separate.

The lines may be rows or columns of the display screen; the skilled person will appreciate that it is arbitrary which electrodes of a display screen are labelled as rows and which are labelled as columns; this applies to references to lines and columns throughout this specification.

The driving according to a frame may involve retrieving data of the frame from a memory and applying the data or corresponding waveforms to the appropriate lines. The first and second frames may or may not have different data values or waveforms, but preferably use data and/or waveforms at least intended for different frames and/or different Frame Address Times (FAT; the duration of each frame).

The first and second subsets may be substantially adjacent and preferably substantially aligned along a direction or locus of a said scanning from said one end to said opposite end. ('Substantially' throughout this specification meaning approximately and preferably exactly). Thus, the first and second subsets may be disposed on and aligned to the overall direction of scanning, e.g., both subsets may be scanned in a single, same direction, for example in the case of a substantially flat and linear display screen. In other words, the subsets are adjacent such that continuity of image is achieved when an image is displayed using both subsets, i.e., there is substantially no gap in the displayed image. Opposing (i.e., facing) ends of the subsets are preferably substantially parallel; however, in the case of a non-linear, i.e., curved, screen the subsets may not be perfectly parallel even if the screen is flat.

Similarly, the first and second backplane regions may not be adjacent, e.g., may be separated by a further backplane region such that the first and second backplane regions are merely end regions of an overall backplane.

The electronic paper display may comprise electrophoretic display medium, e.g., may comprise electronic paper (E-paper). However, other types of display medium may be used, e.g., the display may be of a type created using electrowetting.

Another arrangement provides an electronic paper display screen comprising a plurality of lines of pixels and a plurality of backplane regions for driving respective subsets of said plurality of lines, said backplane regions comprising at least a first said backplane region for driving a first said subset and a second said backplane region for driving a second said subset, the electronic paper display screen comprising a driver configured to drive said pixels according to each of a plurality of frames in turn to perform a single image update of an image displayed on said electronic paper display screen, the electronic paper display screen comprising: said driver configured to drive said plurality of lines according to a first said frame while scanning said plurality of lines from one end of said plurality of lines to an opposite end of said plurality of lines and to drive said plurality of lines according to a second said frame while scanning said plurality of lines from said one end to said opposite end, wherein said driver is configured to begin said scanning while driving the pixels according to the second frame before said scanning while driving the pixels according to the first frame reaches said opposite end, and each said scanning comprises scanning the first subset using the first backplane region and then scanning the second subset using the second backplane region, wherein the second subset is nearer to said opposite end than the first subset.

The first and second backplane regions of such an electronic paper display screen may be physically separate.

The first and second backplane regions may drive a single monolithic layer of display medium.

The first and second subsets may be substantially adjacent and preferably substantially aligned along a direction or locus of a said scanning from said one end to said opposite end.

The nearest lines of said first and second subsets may be substantially parallel.

The electronic paper display may comprise electrophoretic display medium.

An electronic document reader may comprise the electronic paper display screen.

A storage medium may be provided storing computer program instructions to program a programmable processing apparatus to become operable to perform the above method.

A signal may carry computer program instructions to program a programmable processing apparatus to become operable to perform the above method.

For example, an implementation of the above storage medium, storing computer programs or a signal or signals that carry computer program instructions, provides processor control code to implement the above-described method, e.g., on an embedded processor.

The code may be provided on a carrier such as a storage medium in the form of a disk, CD- or DVD-ROM, programmed memory such as read-only memory (Firmware) or Static RAM (SRAM) or Dynamic RAM (DRAM), or on a data carrier such as an optical or electrical signal carrier. Code (and/or data) to implement the above arrangements or implementations may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Advantageously, the above arrangements may each reduce or eliminate visible effects on the image due to the plurality of regions, e.g., where the two backplane regions are abutted adjacent each other and the existence of a join between these regions may otherwise be immediately detectable by the user viewing the image. Such an advantage may be enhanced where the driving according to the second frame begins when the driving according to the first frame starts driving the pixels of the second region after driving the pixels of the first region. Preferably, the driving according to the first and second frames are synchronised such that a predetermined time interval occurs between the driving according to the first frame and the driving according to the second frame, and similarly for any further frames, e.g., between the driving of the second and a third frame, etc.

Alternative Update Schemes

Merely for use in understanding the present invention, the following describes four alternative ways that a two part display could be updated. In all cases, the line scanning of both parts of the display occurs simultaneously, which is generally not the case with embodiments of Pseudo Monolithic updates.

Figure 1:
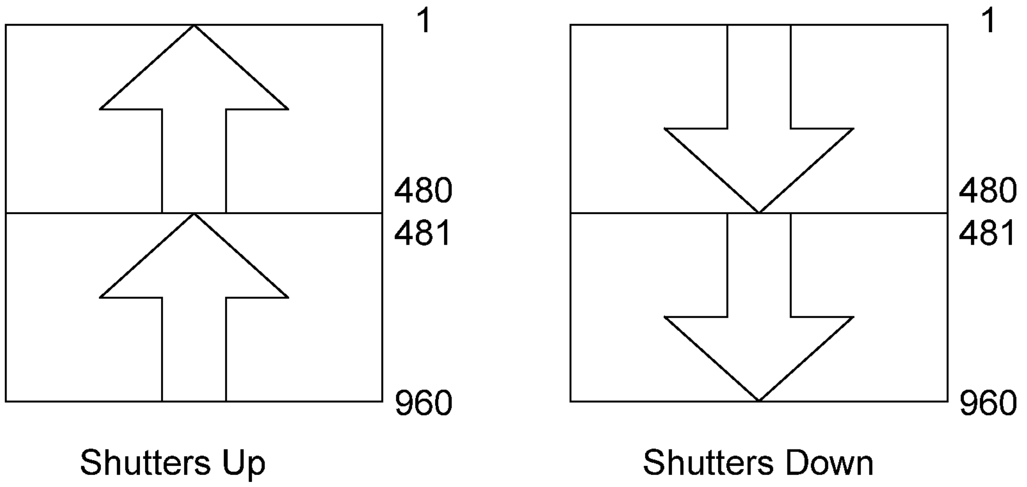
FIG. 1 illustrates a 'Shutters Up/Down' principle.

A first pair of these alternative display update modes operates on a 'Shutters Up/Down' principle, as shown in FIG. 1. In these alternatives, both halves of the display begin updating simultaneously. The 'Shutters Up' mode starts updating from the bottom of each half of the display. The Shutters Down mode starts updating from the top of each half of the display.

Figure 2:
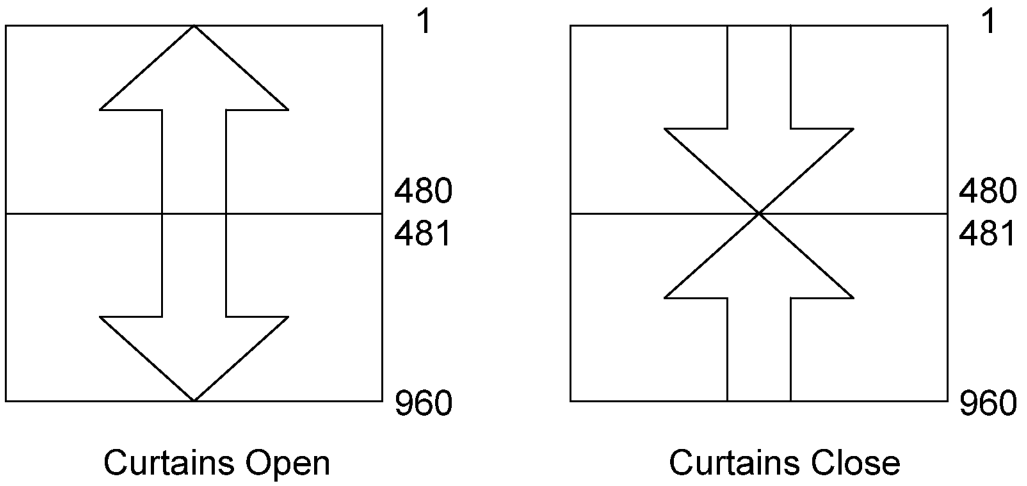
FIG. 2 illustrates a 'Curtains Open/Close' principle.

A second pair of these alternative display update modes operates on a 'Curtains Open/Close' principle, as shown in FIG. 2. In these alternatives, again both halves of the display begin updating simultaneously. However, the 'Curtains Open' mode starts updating from the centre of the overall display and scans outwards towards the edges of the display. The 'Curtains Close' mode starts updating from outer edges of the overall display and scans inwards.

In any of these Shutters/Curtains modes, discontinuities perhaps made worse by the relatively long frame time of, e.g., 5 ms-40 ms, may be visible to the viewer as described below.

Figure 3:
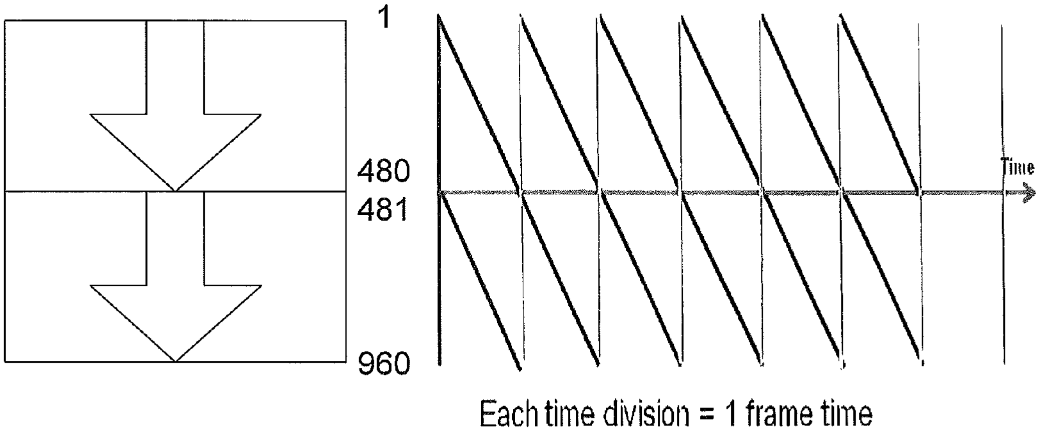
FIG. 3 illustrates a 'Shutters Down' Timing Diagram.

Looking at two of these alternative schemes more closely, FIG. 3 shows the order in which the two halves of the display are updated in Shutters Down mode. Line 1 (the top of the upper half of the display) is updated at the same time as line 481 (the top of the lower half of the display). Similarly, line 480 (the bottom of the upper half of the display) is updated at the same time as line 960 (the bottom of the lower half of the display). Thus, corresponding lines on the two halves are updated at the same time. Moreover, each frame does not begin until a preceding frame is finished. Thus, scanning of line 480 according to the first frame may be immediately followed by scanning of line 481 according to the second frame. Within a single frame, the delay between writes to any two adjacent lines is generally the Line Address Time (LAT), which in an embodiment having a display half of 480 rows will be approx $1/500^{th}$ of the FAT. However, a time delay approximately equal to the time taken to scan half of the display, e.g., just short of the Frame Address Time, e.g., 5 ms-40 ms, may occur between updating of lines 480 and 481. Consequently, a frame transition occurs between adjacent pixels. This parallel update of the two halves continues for the appropriate number of frame times to complete the entire update.

Thus, a shutters up or down scheme may show significant discontinuity between the display parts, e.g., two halves of a reader, during display updates. The human eye may detect a resulting difference between the two halves updated in parallel, particularly with regard to the adjacent lines where the two halves meet, and this may be disconcerting to the end user.

Figure 4:
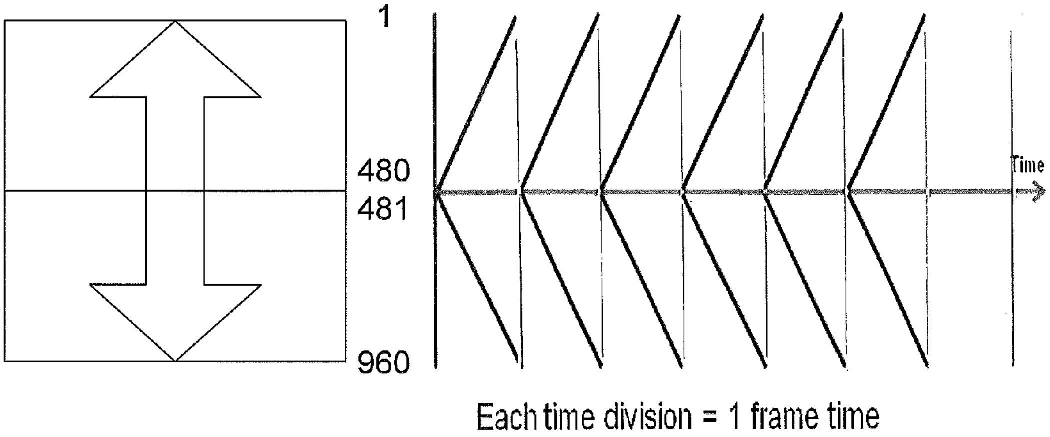
FIG. 4 illustrates a 'Curtains Open' Timing Diagram.

FIG. 4 shows the order in which the two halves of the display are updated in a Curtains Open mode. Line 480 (the bottom of the upper half of the display) is updated at the same time as line 481 (the top of the lower half of the display). Similarly, Line 1 (the top of the upper half of the display) is updated at the same time as line 960 (the bottom of the lower half of the display). This mirror-image update continues for the appropriate number of frame times to complete the entire update.

Thus, a Curtains Open or Closed mode, due to its symmetry, may be more visually pleasing than a Shutters Up or Down mode.

However, the Curtains Open/Closed approach may provoke undesirable display effects due to scanning on different parts, e.g., upper and lower halves, of the reader being performed in opposite directions. For example, the different directions may result in a systematic tonal variation across an overall display screen. Where an arrangement of pixels is asymmetric this may result in different parasitic behaviour of the display halves. For example, where closely-spaced gate electrodes are consistently offset from centre in each pixel, application of a scanning voltage to each line may affect its neighbours unequally. In one half where scanning occurs in a first direction, each line may effectively overwrite the influence of the neighbouring scanned line, whereas in the other half where scanning occurs in an opposite direction, such over-writing may not occur. Tonal variation may then result between the different halves, e.g., one half may be lighter than the other, darker, half. Such tonal variation, e.g., gradual whitening, may furthermore accumulate during an image update comprising a plurality of frames.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. Method of updating at least one image displayed on an electronic display comprising a single monolithic layer of electrophoretic display medium comprising at least a first region and a second region, said first region having a first plurality of lines of pixels and said second region having a second plurality of lines of pixels, the method comprising:

providing a driver comprising a first backplane and a second backplane, wherein said first backplane corresponds to and is under said first region of said electrophoretic display medium and said second backplane corresponds to and is under said second region of said electrophoretic display medium;

driving, using said first backplane of said driver, said pixels of said first region of said single monolithic layer of electrophoretic display medium according to each of a plurality of frames;

driving, using said second backplane of said driver, said pixels of said second region of said single monolithic layer of electrophoretic display medium according to each of a plurality of frames, the method further comprising:

driving said pixels of said first and second regions according to a first said frame by scanning said lines of said regions from a first end of said first region to a second end of said second region, said second end opposite said first end along a direction of a said scanning; and driving said pixels of said first and second regions according to a second said frame by scanning said lines of said regions from said first end to said second end; and wherein said scanning according to the second frame begins before said scanning according to the first frame reaches said second end.

2. Method of claim 1, wherein said driving said pixels of said first and second regions according to each of a plurality of frames comprises driving said pixels according to each of a plurality of frames in turn to perform a single image update.

3. Method of claim 1, wherein said first and second regions are substantially adjacent and preferably substantially aligned along a direction of a said scanning from said first end to second end.

4. Method of claim 1, wherein the first and second regions are physically separate.

5. A non-transitory storage medium storing computer program instructions to program a programmable processing apparatus which when executed by said programmable processing apparatus causes said programming processing apparatus to update at least one image displayed on an electronic display comprising a single monolithic layer of electrophoretic display medium comprising at least a first region and a second region, said first region having a first plurality of lines of pixels and said second region having a second plurality of lines of pixels, said updating comprising:

providing a driver comprising a first backplane and a second backplane, wherein said first backplane corresponds to and is under said first region of the electrophoretic display medium and said second backplane corresponds to and is under said second region of the electrophoretic display medium;

retrieving a plurality of frames wherein said updating comprises driving said pixels of said first region of said single monolithic layer of electrophoretic display medium using said first backplane of said driver according to said plurality of frames, and driving said pixels of said second region of said single monolithic layer of electrophoretic display medium using said second backplane of said driver according to said plurality of frames, driving said pixels of said first and second regions according to a first said frame by scanning said lines of said regions from a first end of said first region to a second end of said second region, said second end opposite said first end along a direction of a said scanning; and driving said pixels of said first and second regions according to a second said frame by scanning said lines of said regions from said first end to said second end;

wherein said scanning according to the second frame begins before said scanning according to the first frame reaches said second end.

6. Electronic display comprising at least a first region and a second region, said first region having a first plurality of lines of pixels and said second region having a second plurality of lines of pixels, the electronic display comprising:

a single monolithic layer of electrophoretic display medium;

a driver comprising a first backplane and a second backplane, wherein said first backplane corresponds to and is under said first region of the electrophoretic display medium and said second backplane corresponds to and is under said second region of the electrophoretic display medium, wherein said first backplane of said driver is configured to drive pixels of said first region of said single monolithic layer of electrophoretic display medium according to each of a plurality of frames and said second backplane of said driver is configured to drive said pixels of said second region of said single monolithic layer of electrophoretic display medium according to each of a plurality of frames, wherein said driver is configured to drive said pixels of said first plurality of lines and said second plurality of lines according to a first said frame while scanning said first and second pluralities of lines from a first end to a second end and to drive said pixels of said first and second pluralities of lines according to a second said frame while scanning said first and second pluralities of lines from said first end to said second end, wherein said first end is an end of said first region and said second end is an end of said second region, said second end opposite said first end along a direction of a said scanning, and wherein said driver is configured to begin said scanning while driving the pixels according to the second frame before said scanning while driving the pixels according to the first frame reaches said second end.

7. Electronic display of claim 6, wherein said driver is configured to drive said pixels of said first and second regions according to each of a plurality of frames to perform a single image update.

8. Electronic display of claim 6, wherein said first and second regions are substantially adjacent and preferably substantially aligned along a direction of a said scanning from said first end to said second end.

9. Electronic display of claim 6, wherein the first and second regions are physically separate.

10. Electronic device comprising the electronic display of claim 6, preferably wherein said device is an electronic document reader.

11. An electronic device having a display comprising a single monolithic layer of electrophoretic display medium comprising at least a first region and a second region, said first region having a first plurality of lines of pixels and said second region having a second plurality of lines of pixels, the electronic device comprising a driver comprising a first backplane and a second backplane, wherein said first backplane corresponds to and is under said first region of the electrophoretic display medium and said second backplane corresponds to and is under said second region of the electrophoretic display medium, wherein said first backplane of said driver is configured to drive said pixels of said first region of said single monolithic layer of electrophoretic display medium according to each of a plurality of frames and said second backplane of said driver is configured to drive said pixels of said second region of said single monolithic layer of electrophoretic display medium according to each of a plurality of frames to perform a single image update of an image displayed on said display, wherein said driver is configured to provide a pulse width modulated (PWM) drive to said display, wherein said PWM drive is coordinated over a plurality of consecutive display frames to update the image.

* * * * *